(12) United States Patent
Caldwell et al.

(10) Patent No.: US 9,153,818 B2
(45) Date of Patent: Oct. 6, 2015

(54) LITHIUM SULFIDE CATHODE MATERIAL WITH TRANSITION METAL COATING

(71) Applicant: Wildcat Discovery Technologies, Inc., San Diego, CA (US)

(72) Inventors: Marissa Caldwell, San Diego, CA (US); Steven Kaye, San Diego, CA (US); David Keogh, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 14/220,036

(22) Filed: Mar. 19, 2014

(65) Prior Publication Data

US 2014/0272570 A1    Sep. 18, 2014

Related U.S. Application Data

(63) Continuation of application No. PCT/US2014/028289, filed on Mar. 14, 2014.

(60) Provisional application No. 61/786,631, filed on Mar. 15, 2013.

(51) Int. Cl.
| | |
|---|---|
| *H01M 4/136* | (2010.01) |
| *H01M 4/1397* | (2010.01) |
| *H01M 4/58* | (2010.01) |
| *H01M 4/62* | (2006.01) |
| *H01M 4/36* | (2006.01) |
| *H01M 4/60* | (2006.01) |

(52) U.S. Cl.
CPC .............. *H01M 4/366* (2013.01); *H01M 4/582* (2013.01); *H01M 4/5815* (2013.01); *H01M 4/60* (2013.01)

(58) Field of Classification Search
CPC ...................................................... H01M 4/366
USPC .................................................... 429/231.95
See application file for complete search history.

(56) References Cited

U.S. PATENT DOCUMENTS

| | | | |
|---|---|---|---|
| 2004/0058246 A1 | 3/2004 | Choi et al. | |
| 2005/0053718 A1 | 3/2005 | Choi et al. | |
| 2008/0131777 A1 | 6/2008 | Hatta et al. | |
| 2013/0065128 A1 | 3/2013 | Li et al. | |
| 2013/0224594 A1* | 8/2013 | Yushin et al. | ............... 429/218.1 |

FOREIGN PATENT DOCUMENTS

| | | |
|---|---|---|
| JP | 2006164695 A | 6/2006 |
| JP | 2007149438 A | 6/2007 |

OTHER PUBLICATIONS

Hayashi et al., All-solid-state rechargeable lithium batteries with Li2S as a positive electrode material, May 2008, Journal of Power Sources, 183, 422-426.*
Fang et al., Mechanism of Lithium storage in MoS2 and the Feasibility of Using Li2S/Mo Nanocomposites as Cathode Materials for Lithium-Sulfur Batteries, Feb. 2012, Chemistry An Asian Journal, 7, 1013-1017.*
Obrovac et al., Electrochemically Active Lithia/Metal and Lithium Sulfide/Metal Composites, Feb. 2002, Electrochemical and Solid-State Letters, 5, A70-A73.*

(Continued)

*Primary Examiner* — Sean P Cullen
(74) *Attorney, Agent, or Firm* — Corridor Law Group, P.C.

(57) ABSTRACT

A composition for use in a battery electrode including lithium-sulfur particles coated with a transition metal species bonded to a sulfur species. Methods and materials for preparing such a composition. Use of such a compound in a battery.

19 Claims, 4 Drawing Sheets

(56) References Cited

OTHER PUBLICATIONS

Seh et al., Two-dimensional layered transition metal disulphides for effective encapsulation of high-capacity lithium sulphide cathodes, Nature Communications, 5, 5017.*

Chianelli et al, Low-Temperature Solution Preparation of Group 4B, 5B, and 6B Transition-Metal Dichalcogenides, Inorganic Chemistry, vol. 17, No. 10, 1978.
International Search Report for PCT/US2014/028289.

* cited by examiner

LITHIUM SULFIDE CATHODE MATERIAL WITH TRANSITION METAL COATING

CROSS-REFERENCE TO RELATED APPLICATIONS

This application is a continuation of International Application No. PCT/US2014/028289, having an international filing date of Mar. 14, 2014 entitled "High Energy Cathode Material," which claims priority to U.S. Provisional Application No. 61/786,631 filed Mar. 15, 2013 entitled "High Energy Cathode Material." This application claims priority to and the benefit of each of these applications, and each application is incorporated herein by reference in its entirety.

FIELD OF THE INVENTION

The present invention is in the field of battery technology and, more particularly, in the area of high-energy materials for use in electrodes in electrochemical cells.

BACKGROUND OF THE INVENTION

Sulfur-based cathodes are promising candidates for next-generation, high-energy batteries because of the high specific capacity (1675 mAh/g) and low cost of the active materials. However, lithium-sulfur battery technology faces a number of challenges that currently limits its widespread adoption. Among those challenges is the issue of polysulfide dissolution, which degrades battery performance through the loss of cathode active material and a rapid reduction in energy capacity.

In contrast to traditional lithium-ion based cathode materials, whereby lithium intercalates into a rigid host framework such as a layered oxide material (e.g., $LiCoO_2$), lithium-sulfur based cathodes utilize a conversion mechanism for energy storage. In lithium-sulfur based cathodes a chemical reaction occurs between the lithium migrating from the anode and the sulfur in the cathode. One of the advantages of conversion electrodes is the potential for higher energy density as a result of being able to use most, if not all, of the available oxidation states of the sulfur. Another advantage is the elimination of a host framework that is electrochemically inactive.

There are two different potential initial states for a Li—S battery. In the first, the cathode initially contains $Li_2S$, which corresponds to the discharged state. In the second, the cathode initially contains S, which corresponds to the charged state. Manufacturing a battery with its cathode initially in the discharged state has distinct advantages over manufacturing one in which the cathode begins in the charged state. In particular, one advantage is the lower cost of the cathode materials. $Li_2S$ is less expensive than pure Li and pure S. Another advantage is the use of superior anode materials such as high-capacity silicon anodes instead of lithium.

Furthermore, beginning with S in the cathode (charged state) typically requires the use of lithium metal anodes. While lithium is a promising anode material, the formation of dendrites on the anode during extended cycling limits the cycle life of the battery and imposes significant safety concerns.

Silicon based anodes can provide an alternative to lithium anodes, but a silicon based anode requires that the source of lithium be contained within the cathode. Present lithium-sulfur cathode materials do not meet this requirement. On the other hand, $Li_2S$ based cathodes allow for the use of high-capacity silicon anodes instead of lithium anodes.

Another major challenge for lithium-sulfur batteries is polysulfide dissolution: a process whereby reaction of the lithium with sulfur in the cathode produces a number of different lithium-sulfur compounds, such as $Li_2S_8$, $Li_2S_6$, $Li_2S_4$, $Li_2S_2$, $Li_2S$. These reaction products are known as polysulfides and, with the exception of $Li_2S$, are typically soluble in the electrolyte solutions of lithium batteries. The dissolution of polysulfides into the electrolyte solution allows for migration of these species to the anode and subsequent reaction with the anode, which forms a layer of $Li_2S$ on the surface and results in an irreversible loss of active sulfur material. This coating limits the usable capacity of the battery and contributes to a rapid capacity fade within the first several cycles. In fact, cycle-life is typically limited to less than 50 cycles for lithium-sulfur based cells.

These and other challenges can be addressed by certain embodiments of the invention described herein

SUMMARY OF THE INVENTION

At least some embodiments of the present battery include an active material for use in a battery electrode.

Certain embodiments relate to a material for use in a battery electrode. The material includes particles of a lithium species and a sulfur species. A coating at least partially, if not completely, covers the particles. The coating includes a transition metal species bonded to a sulfur species.

Certain embodiments relate to a battery including an anode, an electrolyte, and a lithium-sulfur cathode. A transition metal species is coated onto the particles. The coating reduces or prevents the dissolution of polysulfides into the electrolyte.

Certain embodiments relate to a method of making a compound for use in a cathode. The method includes mixing particles of a first material having a lithium species and a sulfur species with a second material having a transition metal species. The method includes reacting the transition metal species with the sulfur species to form a coating on the particles.

DETAILED DESCRIPTION OF THE INVENTION

Figure 1:
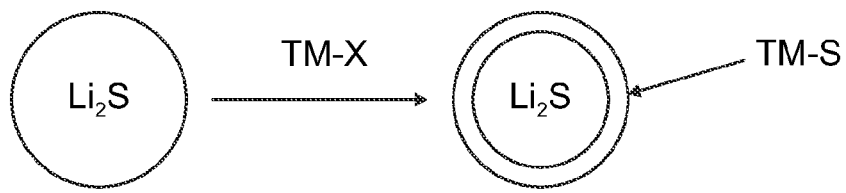
FIG. 1 illustrates a schematic of a reaction between $Li_2S$ and a compound (labeled TM-X) to form a thin coating on the surface of a $Li_2S$ particle.

The following definitions apply to some of the aspects described below. These definitions can likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels of variability.

The term "about" refers to the range of values approximately near the given value in order to account for typical tolerance levels, measurement precision, or other variability.

The term "species" refers to chemical elements, compounds, groups, and moieties.

The terms "bond", "bonded", "bonding", and the like refer to covalent bonds, ionic bonds, dipole-dipole bonds, hydrogen bonds, and combinations thereof as the context dictates.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to the elements in group 17 of the periodic table, including fluorine (F), chlorine (Cl), bromine (Br), iodine (I), and astatine (At).

The term "chalcogen" refers to the chemical elements in group 16 of the periodic table, including oxygen (O), sulfur (S), selenium (Se), tellurium (Te), and polonium (Po).

The term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counterelectrode. For example, specific capacity can be measured upon discharge at a rate of about 0.05 C (e.g., about 14 mA/g) from 4.95 V to 2.0 V versus a Li/Li+ counterelectrode. Other discharge rates and other voltage ranges also can be used, such as a rate of about 0.1 C (e.g., about 28 mA/g), or about 0.5 C (e.g., about 140 mA/g), or about 1.0 C (e.g., about 280 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

To the extent certain battery characteristics can vary with temperature, such characteristics are specified at 25 degrees C., unless the context clearly dictates otherwise.

Ranges presented herein are inclusive of their endpoints. Thus, for example, the range 1 to 3 includes the values 1 and 3 as well as the intermediate values.

In at least some embodiments, novel materials are used as active materials in cathodes of an electrochemical cell. These materials address the challenges described above for existing cathode active materials. As compared to lithium-sulfur batteries in which pure sulfur is initially present in significant quantities as an active material, in embodiments described herein the lithium-sulfur battery initially contains significant quantities of $Li_2S$ in the cathode instead of pure sulfur.

In some embodiments, a new method of reducing the rapid capacity fade resulting from polysulfide dissolution into the electrolyte of a lithium-sulfur battery through the use of a thin conductive coating on the surface of $Li_2S$ is used. A thin conductive coating can be formed on the surface of $Li_2S$ particles using sub-stoichiometric amounts of a transition-metal ("TM") compound that reacts with the $Li_2S$ to form a transition-metal sulfide ("TM-S"). Without being bound to a particular theory or mechanism of action not specifically present in the claims, it is believed that this TM-S coating prevents, or at least reduces, both the interaction between the electrolyte and the polysulfides formed during discharge of the battery and/or the dissolution of polysulfides into the electrolyte solution.

According to certain embodiments, coating the surface of the lithium sulfide particles with a transition metal compound takes places according to the following reaction represented by formula (1):

$$Li_2S + TM\text{-}X \rightarrow TM\text{-}S + LiX \quad (1)$$

where TM represents a transition metal or transition metal/ligand complex, and X represents either a halide or chalcogenide species. Further, TM-X compounds include metal/ligand complexes in which the ligand provides halide or chalcogenide species, such as, for example, iron(III).trifluoromethanesulfonate ("Fe.triflate") or Mn.triflate. Still further, TM-X compound include metal halides complexed with organic anions, such as, for example, [chromium(III) chloride].tetrahydrofuran ("$CrCl_3$.THF") or [nickel chloride] .dimethoxyethane ("$NiCl_2$.DME").

The resulting TM-S coating can be electronically and/or ionically conducting, which can improve the rate performance of a lithium-sulfur battery using coated $Li_2S$. In certain embodiment the TM-X compound is introduced in sub-stoichiometric amounts relative to $Li_2S$, so as to limit the reaction to a thin coating on the $Li_2S$ surface. FIG. 1 illustrates a schematic of a reaction between $Li_2S$ and a compound (labeled TM-X) which forms a thin coating on the surface of the $Li_2S$ particles. This thin surface layer of TM-S can prevent, or at least reduce, the dissolution of polysulfide compounds into the electrolyte formed during discharge of the battery and reduce the rapid capacity fade typically observed during initial battery cycling.

Various metal/ligand complexes can be used in the TM-X compound. One ligand capable of forming such complexes is cyclopentadienyl ("CP"). Examples of TM-X compounds formed from suitable metal/CP complexes include, but are not limited to: $[Mo(Cp)_2].Cl_2$, $[Mo(Cp)_2].Cl_4$, $[Ti(Cp)_2].Cl_2$, $[V(Cp)_2].Cl_2$, and combinations thereof.

Other TM-X compounds include $CoF_3$, $CrCl_2$, $CrCl_3$, $CrO_2Cl_2$, Fe.(acetate), $FeCl_2$, $FeCl_3$, $FeF_2$, $FeF_3$, $MnF_2$, $MnF_3$, $MoCl_4$, $MoOCl_4$, $MoS_2$, $NiF_2$, $TaCl_5$, $TaF_5$, $TiCl_3$, $TiCl_4$, $TiF_4$, $TiS_2$, $VCl_4$, $VOF_3$, and combinations thereof.

In some embodiments, a $Li_2S$ starting material is pre-milled via a ball milling process in order to reduce the particle size and improve the particle size uniformity of the material. The energy of the milling process can be varied depending upon the particle size desired. For example, milling the $Li_2S$ material at 38 g for approximately 4 hours results in a particle size of 100-200 nm.

The milled $Li_2S$ can be combined with the appropriate TM-X compound in the appropriate solvent. Appropriate solvents include those that allow for the mixing and/or dissolution of the TM-X but do not allow the $Li_2S$ to be dissolved. Specific examples of such solvents include, but are not limited to: benzene, tetrahydrofuran, and ethyl acetate.

The resulting material can be agitated under an inert atmosphere for given period of time and temperature in order to drive the reaction between the $Li_2S$ and the transition metal compound. Once the reaction is near completion, if not complete, the solvent can be removed via evaporation or other methods.

The coated $Li_2S$ material can then be annealed in order to enhance the crystallinity of the TM-S coating. Suitable temperature ranges for the annealing step are between about 200 degrees C. and about 850 degrees C., between about 250 degrees C. and about 800 degrees C., between about 300 degrees C. and about 750 degrees C., between about 350 degrees C. and about 700 degrees C., between about 400 degrees C. and about 650 degrees C., between about 450 degrees C. and about 600 degrees C., or between about 500 degrees C. and about 550 degrees C., although other ranges may work as well. However, at temperatures above 850 degrees C., the coating likely to start decomposing.

Suitable time ranges for the annealing step are between about 0.5 hours and about 12 hours, between about 1 hours and about 11.5 hours, between about 1.5 hours and about 11 hours, between about 2 hours and about 10.5 hours, between about 2.5 hours and about 10 hours, between about 3 hours and about 9.5 hours, between about 3.5 hours and about 9 hours, between about 4 hours and about 8.5 hours, between about 4.5 hours and about 8 hours, between about 5 hours and about 7.5 hours, between about 5.5 hours and about 7 hours, or between about 6 hours and about 6.5 hours, although other ranges may work as well. In at least one embodiment, the coated $Li_2S$ material was annealed at 400 degrees C. for 6 hours.

Figure 2:
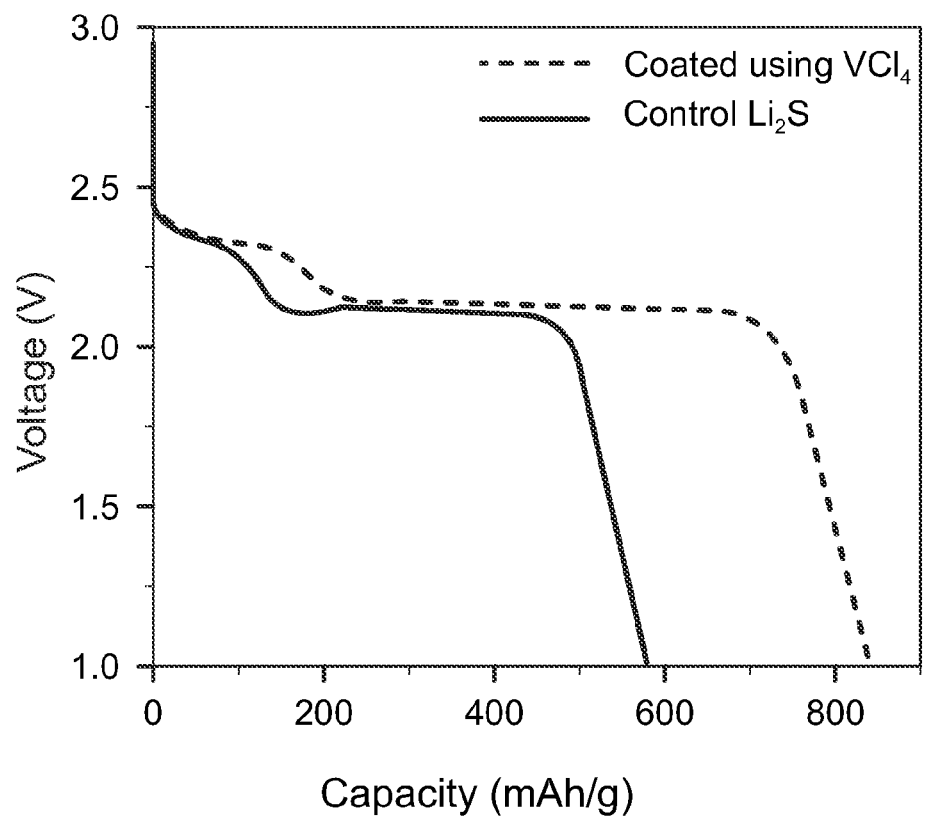
FIG. 2 illustrates voltage versus capacity traces of an uncoated control material ($Li_2S$) and the control material $Li_2S$ coated. The coated material shows improvement in first cycle discharge capacity.

FIG. 2 illustrates voltage versus capacity traces of an uncoated control material ($Li_2S$) and the control material $Li_2S$ coated according to certain embodiments. The coated material shows improvement in first cycle discharge capacity. In this particular example, the TM-X material was $VCl_4$, which improved first cycle discharge capacity by approximately 44%, from 582 mAh/g for the control to 840 mAh/g for the TM-S coated material.

Figure 3A:
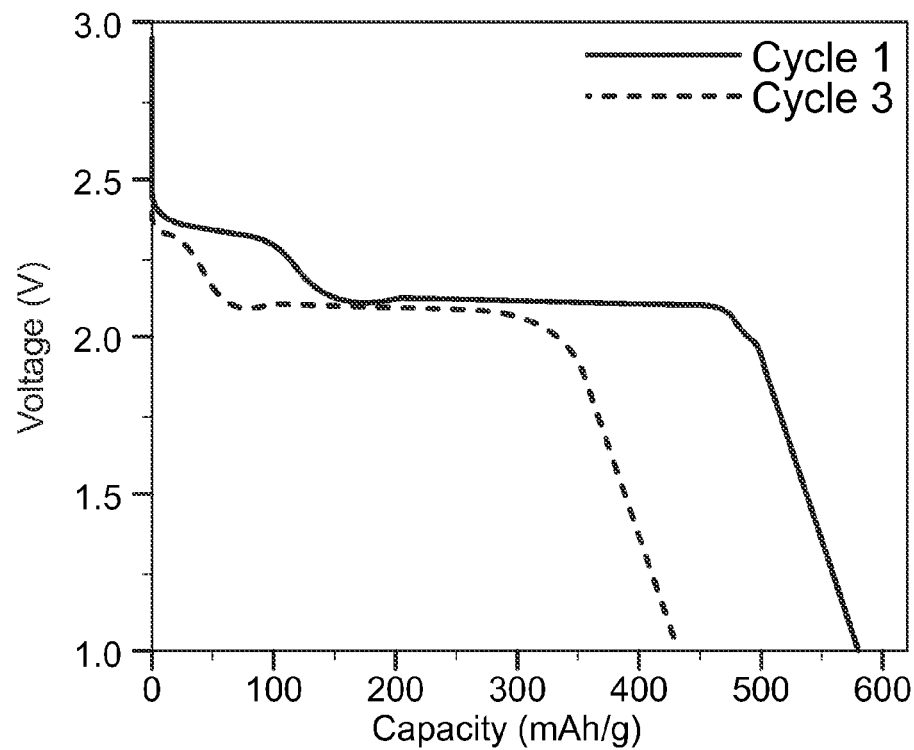
FIG. 3A illustrates voltage versus capacity traces of an uncoated control material ($Li_2S$) showing diminished performance at cycle 3 as compared to cycle 1.
Figure 3B:
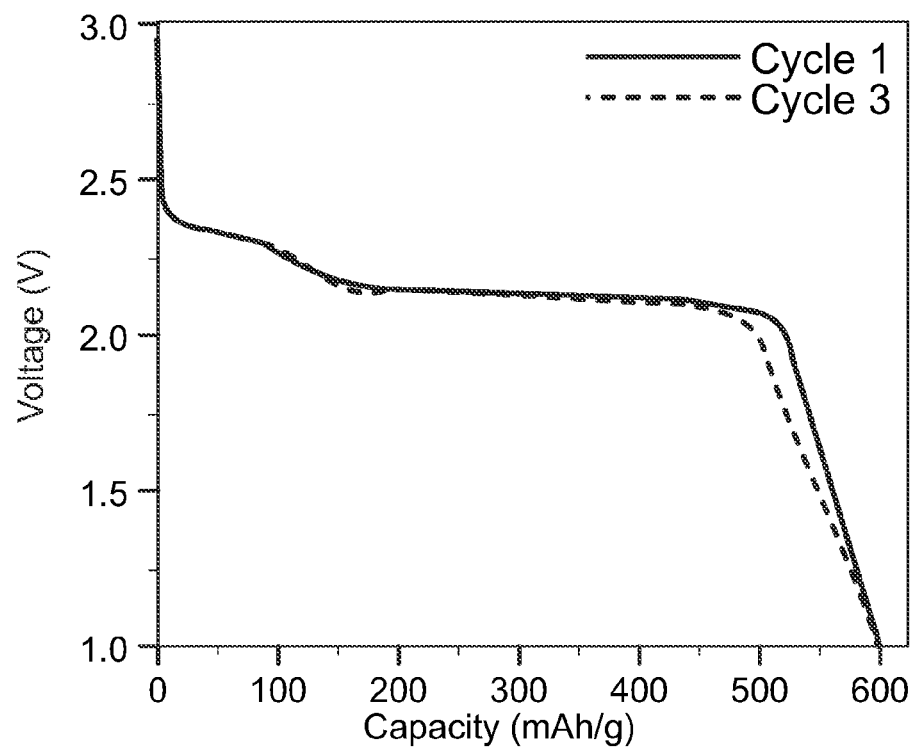
FIG. 3B illustrates voltage versus capacity traces of the control material $Li_2S$ coated. The coated material shows improved performance at cycle 3 as compared to the uncoated control of FIG. 3A.

FIGS. 3A and 3B illustrate voltage versus capacity traces of an uncoated control material ($Li_2S$) and of the control material $Li_2S$ coated according to certain embodiments, respectively. The control material shows diminished performance at cycle 3 as compared to cycle 1. The coated material shows improved performance at cycle 3 as compared to the uncoated control. Specifically, the third cycle capacity retention is improved to about 99% for the coated $Li_2S$, compared with 74% for control. In this particular example, the TM-X material was $CrCl_3$.

Figure 4A:
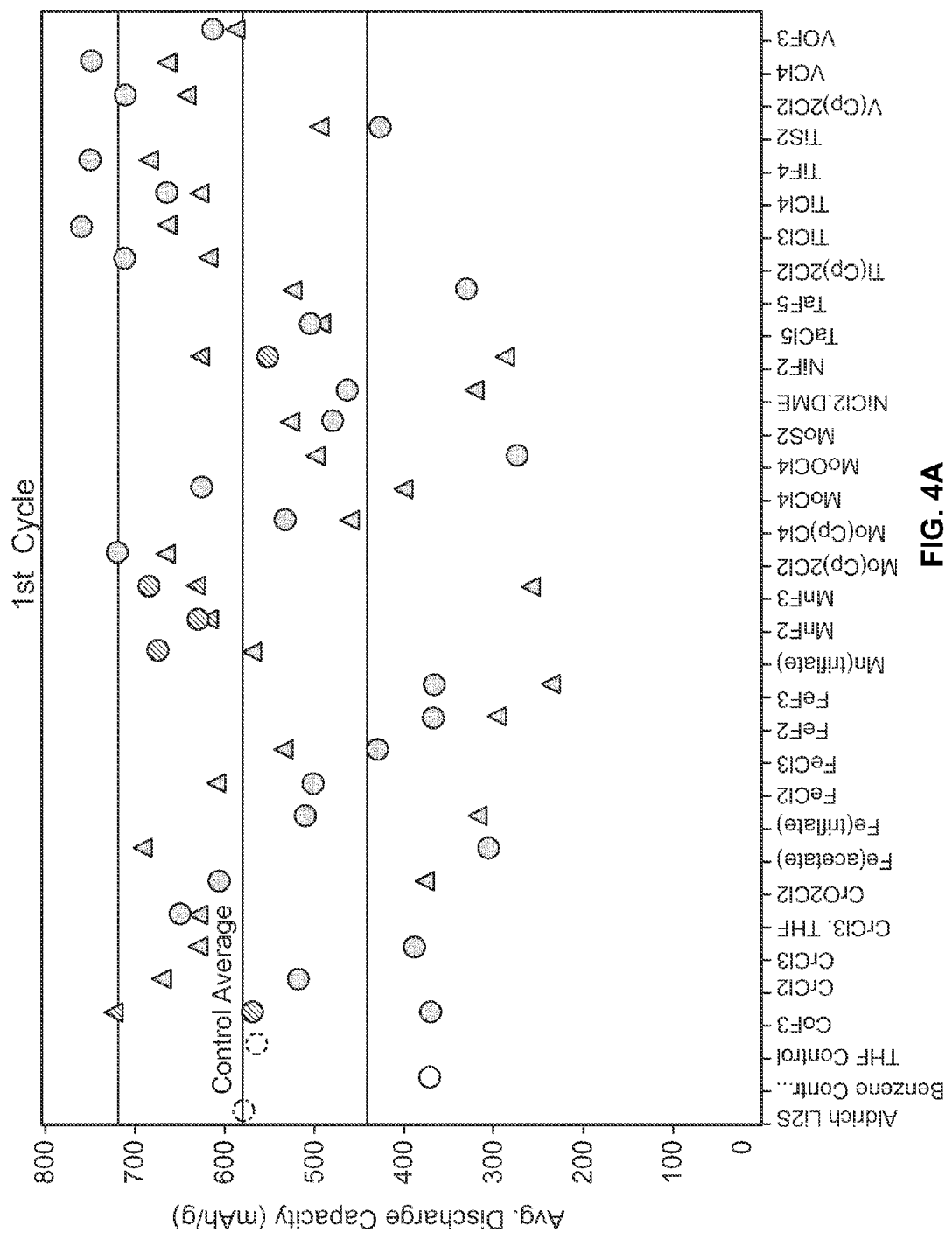
FIG. 4A illustrates the first cycle discharge capacity performance of several different compounds used to coat compounds of control material. The area defined by the two lines on either side of the control average line represents the standard deviation of control sample.

FIG. 4A illustrates the first cycle discharge capacity performance of several different compounds according to certain embodiments used to coat compounds of control material. The area defined by the two lines on either side of the control average line represents the standard deviation of the control sample dissolved in the solvents benzene and TH with no TM-X added to evaluate effects the solvents have on the $Li_2S$.

Figure 4B:
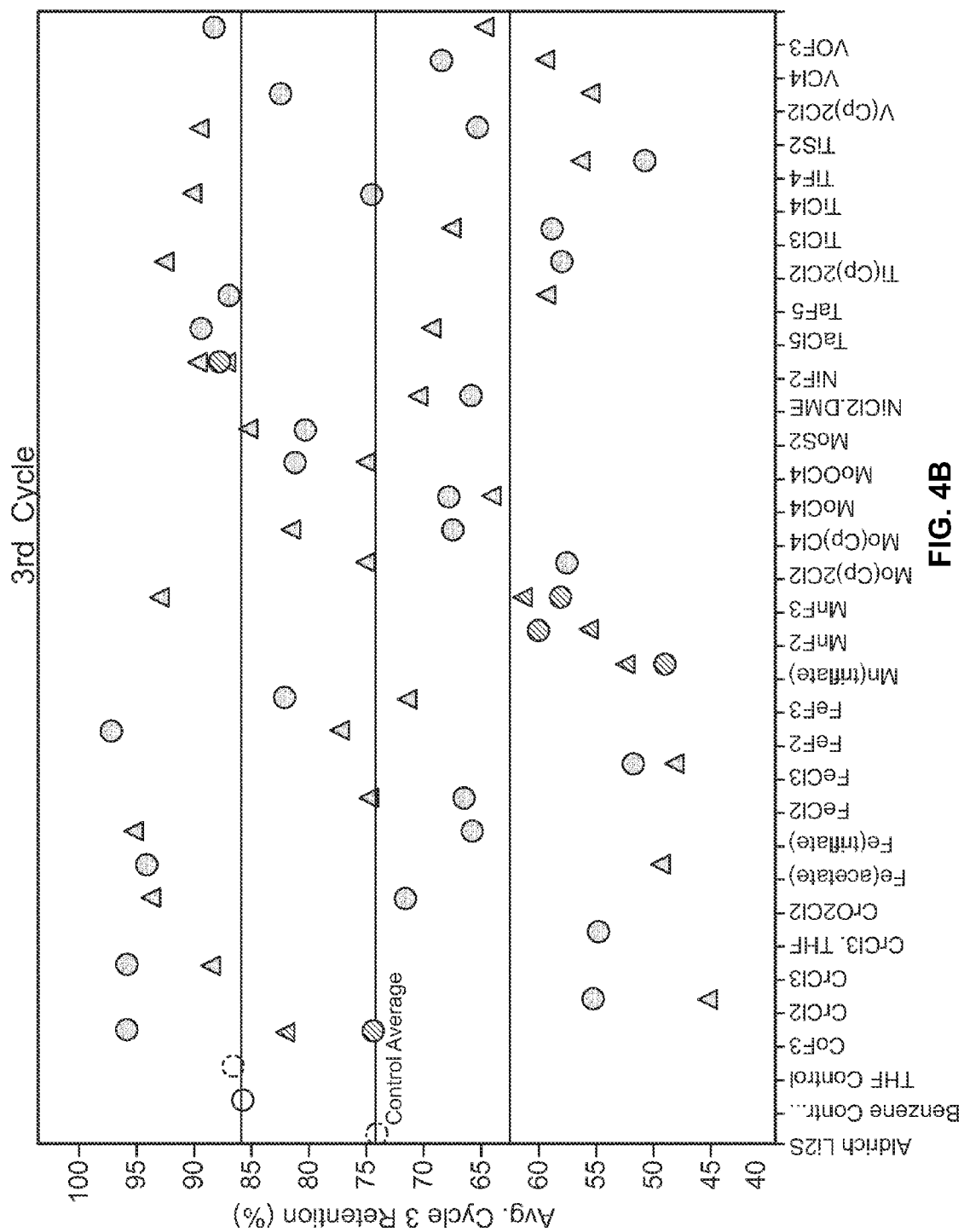
FIG. 4B illustrates the third cycle capacity retention (expressed as a percentage of the first cycle) performance of several different compounds used to coat compounds of control material. The area defined by the two lines on either side of the control average line represents the standard deviation of control sample.

FIG. 4B illustrates the third cycle capacity retention (expressed as a percentage of the first cycle) performance of several different compounds according to certain embodiments used to coat compounds of control material. The area defined by the two lines on either side of the control average line represents the standard deviation of the control sample dissolved in the solvents benzene and THF with no TM-X added to evaluate effects the solvents have on the $Li_2S$. The passages below, explains how the data in FIGS. 2, 3, and 4 was obtained.

SPECIFIC EXAMPLE

Materials and Synthetic Methods. In a first step, the $Li_2S$ was pre-milled using high-energy ball milling. The milled $Li_2S$ was then combined with the appropriate TM-X compound in the appropriate solvent. The resulting material was agitated under an Ar atmosphere for 12 hours, and the solvent was then evaporated prior to annealing under an inert atmosphere. Unless otherwise specified, materials were obtained from common commercial sources without further purification.

Electrode Formulation. Cathodes based on the coated $Li_2S$ material were prepared using a formulation composition of 70:20:10 (active material:binder:conductive additive) according to the following formulation method: 66.7 mg PEO (Sigma Aldrich) was dissolved in 15 mL of solvent (typically benzene or THF) overnight. 133.2 mg of conductive additive (KJ-600) was added to the solution and allowed to stir for several hours. 31.1 mg of the coated $Li_2S$ material was then added to 1 mL of this solution and stirred for 48 hours. Films were cast by dropping about 65 mL of slurry onto carbon coated aluminum current collectors and drying at 50 degrees C. for 30 minutes or more. Electrodes were further dried at 150 degrees C. under vacuum for 3-12 hours before being brought into a glove box for battery assembly.

Electrochemical Characterization. All batteries were assembled in a high purity argon filled glove box (M-Braun, $O_2$ and humidity contents <0.1 ppm), unless otherwise specified. Cells were made using lithium metal as an anode, Celgard 2400 separator, and 90 mL of 1M LiTFSI in 1:1 DME:DOXL electrolyte. Electrodes and cells were electrochemically characterized at 30 degrees C. with a constant current C/20 charge followed by a constant voltage charge step at 3.0V, and a C/20 discharge down to 1.0V, for the first three cycles. For all subsequent cycles, a constant current C/10 charge and discharge between 3.0 and 1.0V was used, without a constant voltage step.

While the invention has been described with reference to the specific embodiments thereof, it should be understood that various changes can be made and equivalents can be substituted without departing from the true spirit and scope of the invention. In addition, many modifications can be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations can be combined, sub-divided, or re-ordered to form an equivalent method without departing from the teachings of the invention. Accordingly, unless specifically indicated herein, the order and grouping of the operations are not limitations of the invention.

What is claimed is:

1. An electrode for use in a battery comprising:
a particle formed from a lithium-sulfur species; and
a coating covering substantially all of the particle, wherein the coating is a reaction product of a reaction between the particle and a coating compound comprising a transition metal species and a halogen species, wherein the reaction product is the transition metal species bonded to a sulfur species of the lithium-sulfur species.

2. The electrode of claim 1 wherein the coating is formed from the transition metal species reacting with the lithium-sulfur species.

3. The electrode of claim 1 wherein the lithium-sulfur species is $Li_2S$.

4. The electrode of claim 1 wherein the electrode acts as a cathode for the battery.

5. The electrode of claim 1 wherein the coating compound is selected from the group consisting of $CoF_3$, $CrCl_2$, $CrCl_3$, $CrO_2Cl_2$, Fe.(acetate), $FeCl_2$, $FeCl_3$, $FeF_2$, $FeF_3$, $MnF_2$, $MnF_3$, $MoCl_4$, $MoOCl_4$, $MoS_2$, $NiF_2$, $TaCl_5$, $TaF_5$, $TiCl_3$, $TiCl_4$, $TiF_4$, $TiS_2$, $VCl_4$, and $VOF_3$.

6. The electrode of claim 1 wherein the coating compound is selected from the group consisting of $[Mo(Cp)_2].Cl_2$, $[Mo(Cp)_2].Cl_4$, $[Ti(Cp)_2].Cl_2$, and $[V(Cp)_2].Cl_2$.

7. The electrode of claim 1 wherein the coating compound is selected from the group consisting of iron(III).trifluoromethanesulfonate and manganese(III).trifluoromethanesulfonate.

8. The electrode of claim 1 wherein the coating compound is selected from the group consisting of [chromium(III) chloride].tetrahydrofuran and [nickel chloride].dimethoxyethane.

9. A method of making a compound for use in an electrode comprising:

mixing a cathode material, wherein the cathode material comprises a lithium species and a sulfur species, with a coating material, wherein the coating material comprises a transition metal species; and reacting the coating material with the cathode material to form a coating on the cathode material, wherein the coating comprises the transition metal species bonded to the sulfur species.

10. The method of claim 9 wherein the mixing further comprises adding a solvent.

11. The method of claim 10 further comprising removing excess of the solvent.

12. The method of claim 10 further comprising annealing the coated cathode material.

13. The method of claim 9 wherein the transition metal species further comprises a halogen species.

14. The method of claim 9 wherein the transition metal species further comprises a chalcogen species.

15. The method of claim 9 wherein the transition metal species further comprises a complex of the transition metal and a ligand.

16. The method of claim 9 wherein the transition metal species is selected from the group consisting of $CoF_3$, $CrCl_2$, $CrCl_3$, $CrO_2Cl_2$, Fe.(acetate), $FeCl_2$, $FeCl_3$, $FeF_2$, $FeF_3$, $MnF_2$, $MnF_3$, $MoCl_4$, $MoOCl_4$, $MoS_2$, $NiF_2$, $TaCl_5$, $TaF_5$, $TiCl_3$, $TiCl_4$, $TiF_4$, $TiS_2$, $VCl_4$, and $VOF_3$.

17. The method of claim 9 wherein the transition metal species is selected from the group consisting of $[Mo(Cp)_2].Cl_2$, $[Mo(Cp)_2].Cl_4$, $[Ti(Cp)_2].Cl_2$, and $[V(Cp)_2].Cl_2$.

18. The method of claim 9 wherein the transition metal species is selected from the group consisting of iron(III).trifluoromethanesulfonate and manganese(III).trifluoromethanesulfonate.

19. The method of claim 9 wherein the transition metal species is selected from the group consisting of [chromium(III) chloride].tetrahydrofuran and [nickel chloride].dimethoxyethane.

* * * * *